United States Patent [19]

Schmidt et al.

[11] Patent Number: 4,968,433

[45] Date of Patent: Nov. 6, 1990

[54] REMOVAL OF ORGANIC CATIONS FROM POLAR FLUIDS

[75] Inventors: Donald L. Schmidt; Norman E. Skelly, both of Midland, Mich.

[73] Assignee: The Dow Chemical Company, Midland, Mich.

[21] Appl. No.: 447,146

[22] Filed: Dec. 6, 1989

[51] Int. Cl.$^5$ ............................................. B01D 15/08
[52] U.S. Cl. ..................................... 210/679; 210/681; 210/691; 210/903; 210/906; 210/908
[58] Field of Search ............... 210/660, 661, 679, 681, 210/690, 691, 694, 903, 906, 908

[56] References Cited

U.S. PATENT DOCUMENTS

| | | | |
|---|---|---|---|
| 3,013,995 | 12/1961 | Slough | 210/681 |
| 3,341,479 | 9/1967 | Aftergut | 210/681 |
| 3,370,021 | 2/1968 | Kohn | 210/681 |
| 4,487,698 | 12/1984 | Idel et al. | 210/908 |

*Primary Examiner*—Peter Hruskoci
*Assistant Examiner*—Krisanne Shideler

[57] ABSTRACT

Cationic organic impurities such as ternary sulfonium ions and quaternary ammonium and phosphonium compounds are effectively removed from polar liquids such as water or water/alcohol mixtures by contacting the polar liquid with an absorbent comprising a trinitroarenol such as a picric acid. This method is particularly effective for removing such cationic impurities from polar liquids containing organic zwitterions.

14 Claims, No Drawings

REMOVAL OF ORGANIC CATIONS FROM POLAR FLUIDS

BACKGROUND OF THE INVENTION

This invention relates to methods for removing organic cations to very low levels from polar fluids.

Cationic organic compounds, particularly the onium compounds, are often highly toxic even when present in very dilute solutions. For example, quaternary ammonium and other onium salts have neuromuscular blocking properties which upon exposure cause muscular paralysis. This type of toxic effect is discussed in *Introduction to Chemical Pharmacy*, 2nd. ed., Wiley & Sons, 125 (1964).

The removal of organic cations from aqueous or other polar liquids, particularly to low levels needed to avoid unacceptable toxicity, is often a difficult problem. Methods for removing these organic cations, such as passing the solutions through a cation-exchange resin or extracting the cations from the solutions with a water-immiscible organic phase containing a phenolic compound as described in U.S. Pat. No. 4,487,698, are known. Unfortunately, both of these methods are either not effective in removing the organic cations to levels below 5 parts per million (ppm) or are impractical due to the required large volumes of solvents and the contamination of the aqueous or other polar phase with phenolic compounds. Such methods are usually totally ineffective when it is desired to remove an organic cation from a polar liquid containing other different cations which are desirable to retain in the polar liquid.

In view of the deficiencies of the conventional methods for removing organic cations from polar liquids, it is highly desirable to provide a method which is capable of removing essentially all of an organic cation from a polar liquid.

SUMMARY OF THE INVENTION

The present invention is such an improved method for removing cationic organic impurities from polar liquids. This improved method includes the step of contacting a polar liquid containing a cationic organic impurity with an absorbent comprising a trinitroarenol or a trinitroaryl sulfonic acid under conditions sufficient to remove substantially all of the impurity from the polar liquid.

Surprisingly, the present invention enables the essentially complete separation of organic cations from other organic compounds such as organic zwitterions, organic anions and non-ionic organic compounds. Thus, the method of the present invention is advantageously employed in the purification of organic zwitterions. This method is also useful in processes which employ phase-transfer catalysts. These phase-transfer catalysts are generally quaternary ammonium salts and phosphonium salts and are described in *Angewandte Chemie*, "Advances in Phase-Transfer Catalysis", Vol. 16, No. 8, p. 493.

DETAILED DESCRIPTION OF ILLUSTRATIVE EMBODIMENTS

Organic cations which are preferably removed from polar liquids by the method of this invention are generally characterized by having at least one onium moiety per molecule wherein the onium moiety is advantageously sulfonium, $-S\oplus\diagup$, guaternary ammonium $\diagdown\diagup N\oplus\diagup\diagdown$, and phosphonium $\diagdown\diagup P\oplus\diagup\diagdown$.

The onium moiety is preferably covalently bonded to alkyl, cycloalkyl, alkenyl, aryl and similar predominantly hydrocarbon moieties which contain heteroatomic functionalities such as ether, ketone, ester, aldehyde, alcohol, sulfide, sulfoxide, sulfone, amine, amide and nitrile. Such hydrocarbon moieties and predominantly hydrocarbon moieties preferably have from one to eighteen carbons, most preferably from one to twelve carbons. Examples of such organic cations include cationic compounds suitable for use as phase-transfer catalysts such as described in *Aldrichimica Acta*, Vol. 9, No. 3, p.35–45 (1976). Other organic cations advantageously removed by the method of this invention include organic sulfonium compounds such as cyclic aliphatic sulfonium salts, e.g., thiophenium salts: acyclic sulfonium salts, e.g., trialkyl sulfonium salts: and aromatic sulfonium salts, e.g., triaryl sulfonium salts. Additional organic cations which are beneficially removed include the quaternary ammonium salts and the pyridinium salts, phosphonium salts as well as other onium salts.

Examples of the cyclic aliphatic sulfonium salts include 1-(4,5-dihydro-3-thienyl)tetrahydrothiophenium chloride and sulfonium isomers and analogs thereof. Examples of trialkylsulfonium salts include trimethylsulfonium chloride, triethylsulfonium chloride, bis(n-butyl)methylsulfonium bromide and analogs thereof. Examples of quaternary ammonium and phosphonium salts include tetramethylammonium bromide, benzyltrimethylammonium bromide, tetrabutylammonium bromide, trioctylmethylammonium chloride, triphenylmethylammonium bromide, tetraphenylphosphonium bromide and tetrabutylphosphonium chloride.

For the purposes of this invention, polar liquids are defined as normally liquid substances having a degree of polarity equal to or greater than that of octanol. Examples of suitable polar liquids include water, alkanols such as methanol and ethanol, ethylene glycol and monoethers of ethylene glycol and propylene glycol. Of these liquids, water is the most preferred.

In one preferred practice of the present invention, the polar liquid also contains an organic zwitterion which is not removed from the polar liquid during the practice of the improved method of this invention. Examples of such zwitterions are those described in U.S. Pat. Nos. 4,089,877: 4,118,297: 4,130,543 and 4,111,914, all of which are hereby incorporated by reference.

The absorbents employed in the practice of the invention contain a nitrated aromatic acid which is advantageously a trinitroarenol or a trinitroaryl sulfonic acid. By arenol is meant an aromatic compound having a phenolic hydroxyl. The trinitroarenols preferably employed include 2,4,6-trinitrophenol (picric acid) and 2,4-dinitrophenol, with picric acid being most preferred. Examples of preferred trinitroaryl sulfonic acids include 2,4,6-trinitrophenyl sulfonic acid and 2,4-dinitrophenyl sulfonic acid, with 2,4,6-trinitrophenyl sulfonic acid being most preferred.

In addition to the aforementioned acids, the absorbents also comprise a solid support or carrier such as activated carbon, alumina, titania or similar substrates, with activated carbon being most preferred. The solid support advantageously has an average particle diameter in the range from about 0.08 to about 2 millimeters (mm) and a surface area in the range from about 900 to about 1400 square meters/gram ($N_2$ BET method). The activated carbon may also be bound to a suitable secondary support such as fibers of polyester or similar material.

The picric acid or other suitable nitrated aromatic acid is advantageously adsorbed on the support by exposing the support to a solution of the acid dissolved in water, alcohol or mixture thereof. This acid solution is preferably added to the top of a column of the absorbent and passed through the column such that the bottom portion of the column does not contain any of the acid.

In practicing the method of the invention, it is preferable to first prepare a cylindrical column of the absorbent of sufficient size to permit effective removal of the organic cation as well as an acceptable rate of flow of the polar liquid through the column. While the most optimum size of the column will vary with the particular organic cation to be removed, the particular polar liquid employed and the loading of acid on the support, the ratio of column length to diameter is preferably in the range from about 1 to about 10, with a ratio of 2.5:1 being most preferred.

The polar liquid is then passed through the cylindrical column at a rate in the range from about 1 to about 50 millimeters/minute per 11.4 square centimeters of column area, most preferably at a rate from about 4 to about 8 ml/min per 11.4 $cm^2$. Normally the organic cation is removed under ambient conditions although somewhat higher than ambient pressures can be used to accelerate passage of the polar liquid through the column.

Upon the exit of the polar liquid from the column, the liquid, which usually contains less than 5 ppm, most preferably less than 0.5 ppm, of the organic cation, is ready for use or for further processing.

ILLUSTRATIVE EXAMPLES

The following examples are given to illustrate the invention and should not be interpreted as limiting it in any way. Unless stated otherwise, all parts and percentages are given by weight.

Example 1

Sufficient activated carbon (20-50 mesh - ASTM-2862 obtained from Barneby-Cheney) is slurried in a 2-propanol/water mixture (20:80 by volume) and poured into a glass column (3.8 cm diameter) to yield a column which is 8.8 cm in length. The excess water/alcohol mixture is then eluted. A solution of 100 ml of 2-propanol/water (1:1 by volume) containing 0.5 gram of damp, purified 2,4,6-trinitrophenol (Picric Acid Purified, Sandoz Chemicals, Charlotte, N.C. 28205) is passed through the column at the rate of about 5 ml/min. After eluting the column with 100 ml of water, 450 grams of an aqueous solution of 44.1 grams of a bis(cyclic sulfonium aromatic) zwitterion represented by Formula I hereinafter and 0.044 gram of toxic cationic impurity represented by Formula II hereinafter are passed through the column at the rate of 5 ml/min. After eluting the column with 137 ml of water, 558.3 g of eluate containing 35.0 g of the zwitterion represented by Formula I is obtained Analysis of the eluate using ion-exchange chromatography with gradient elution and photodiode-array detectors indicates that it contains less than 0.5 ppm based on zwitterion of the toxic cationic impurity.

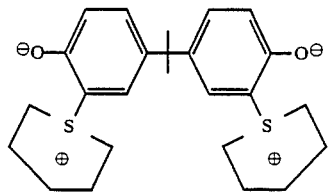

Formula I

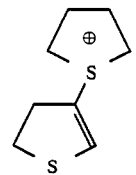

Formula II

When a control method is run following the foregoing procedure except that no picric acid is employed, the eluate shows essentially no reduction in the toxic cationic impurity.

Example 2

Activated carbon as employed in Example 1 is slurried in a packing liquid consisting of 2-propanol and water in a 50/50 weight ratio and poured into a cylindrical column. The carbon is used in an amount which is sufficient to provide a packed column having a length to diameter ratio of 2.5. A 0.5 percent solution of picric acid in a water/propanol solution (50/50 by weight) is then carefully introduced into the top of the column such that the carbon is not disturbed and passes through the column at the rate of 12 ml/min. per 11.4 $cm^2$ of the column top surface. The picric acid solution is passed through the column until the solution level is even with the top of the carbon column. The ratio of the volume of the picric acid solution to column volume is 2:1. An aqueous solution containing 9.8 percent solids of the zwitterion represented by Formula I and 977 ppm of the sulfonium impurity represented by Formula II is carefully introduced into the column such that it passes through the column at the rate of 6 ml/min. per 11.4 $cm^2$ of the column top surface. After passing through the column until the volume of eluate to total packed carbon column volume reaches a ratio of 13, the solution is analyzed for the sulfonium impurity and found to contain less than 0.5 ppm of the impurity.

What is claimed is:

1. In a process for removing a cationic organic impurity from a polar liquid wherein the polar liquid containing the impurity is contacted with an absorbent capable of removing the impurity from the liquid, the improvement comprising using a trinitroarenol or a trinitroaryl sulfonic acid as the absorbent.

2. The improvement of claim 1 using picric acid deposited on activated carbon as the absorbent.

3. The improvement of claim 2 wherein the cationic organic impurity is an organic sulfonium ion.

4. The improvement of claim 3 wherein the sulfonium ion is a cycloaliphatic sulfonium ion.

5. The improvement of claim 4 wherein the cycloaliphatic sulfonium ion is 1-(4,5-dihydro-3-thienyl)tetrahydrothiophenium.

6. The improvement of claim 3 wherein the sulfonium ion is trimethylsulfonium, triethylsulfonium or bis(n-butyl)methylsulfonium.

7. The improvement of claim 3 wherein the polar liquid is water or a solution of water and an alkanol having 2 or 3 carbons which has dissolved therein a cyclic aliphatic sulfonium zwitterion.

8. The improvement of claim 7 wherein the zwitterion is represented by the formula:

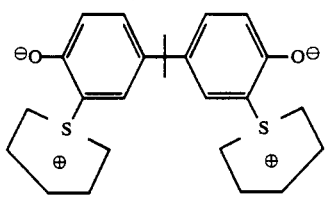

Formula I

9. The improvement of claim 2 wherein the cationic organic impurity is a quaternary ammonium or phosphonium ion.

10. The improvement of claim 9 wherein the quaternary ammonium ion is tetramethylammonium, benzyltrimethylammonium, tetrabutylammonium, trioctylmethylammonium or triphenylmethylammonium.

11. The improvement of claim 9 wherein the quaternary phosphonium ion is tetraphenylphosphonium or tetrabutylphosphonium.

12. The improvement of claim 2 wherein the polar liquid is water or a solution of water and an alkanol having up to 4 carbons which has dissolved therein an organic zwitterion.

13. A method for removing cationic organic impurities from polar liquids which comprises the step of contacting a polar liquid containing a cationic organic impurity with an absorbent comprising a trinitroarenol or a trinitroaryl sulfonic acid under conditions sufficient to remove substantially all of the impurity from the polar liquid.

14. The method of claim 13 wherein the concentration of the cationic impurity in the polar liquid after completion of the method is less than 10 ppm based on the polar liquid.

* * * * *